(12) United States Patent
Tam

(10) Patent No.: US 7,143,364 B1
(45) Date of Patent: Nov. 28, 2006

(54) SYSTEM FOR AND METHOD OF SELECTING AND PRESENTING USER CUSTOMIZABLE PREFERENCES

(75) Inventor: Edwin Tam, Port Moody (CA)

(73) Assignee: Infowave Software Inc., Barnaby (CA)

( * ) Notice: Subject to any disclaimer, the term of this patent is extended or adjusted under 35 U.S.C. 154(b) by 399 days.

(21) Appl. No.: 10/045,474

(22) Filed: Oct. 22, 2001

(51) Int. Cl.
*G06F 15/00* (2006.01)
*G06F 13/00* (2006.01)

(52) U.S. Cl. .................. 715/840; 715/841

(58) Field of Classification Search ............ 345/762, 345/763, 157, 764, 765; 715/763, 840, 853, 715/738, 744, 745, 739, 850, 851, 841, 843, 715/845

See application file for complete search history.

(56) References Cited

U.S. PATENT DOCUMENTS

| | | | |
|---|---|---|---|
| 5,814,798 A * | 9/1998 | Zancho ............... | 235/380 |
| 6,321,256 B1 * | 11/2001 | Himmel et al. ......... | 709/218 |
| 6,324,511 B1 * | 11/2001 | Kiraly et al. ........... | 704/260 |
| 6,475,146 B1 * | 11/2002 | Frelburger et al. ...... | 600/437 |
| 6,631,496 B1 * | 10/2003 | Li et al. ................ | 715/501.1 |
| 2002/0025085 A1 * | 2/2002 | Gustafson et al. ...... | 382/311 |
| 2002/0194297 A1 * | 12/2002 | Jen et al. ............... | 709/217 |
| 2003/0009411 A1 * | 1/2003 | Ram et al. ............. | 705/37 |

* cited by examiner

*Primary Examiner*—Cao (Kevin) Nguyen
(74) *Attorney, Agent, or Firm*—Rathe Patent & IP Law

(57) ABSTRACT

The system and method herein provide selecting and presenting user customizable preferences. Techniques involved can include having a custom entry in a list box such that the list view item updates its displayed item based upon the configuration settings. As such, the user can see what has been set as a custom preference without having to go into secondary dialog boxes. The techniques can be particularly advantageous with wireless devices that need to minimize the number of fields that must be viewed to get information.

20 Claims, 5 Drawing Sheets

SYSTEM FOR AND METHOD OF SELECTING AND PRESENTING USER CUSTOMIZABLE PREFERENCES

FIELD OF THE INVENTION

The present invention relates generally to computerized methods and systems. Further, an exemplary embodiment of the present invention relates to a system for and a method of selecting and presenting user customizable preferences.

BACKGROUND OF THE INVENTION

Computer programs often provide for user defined preferences. Preferences can be directed to the size of a view, image resolution, or any other variable parameter for the computer program. Conventional computer programs allow users to select from pre-defined preferences as well as a custom option. The custom option generally allows a user to select specific parameters for the preferences that are not provided for in the pre-defined selections. Nevertheless, once the user has selected a custom setting, an indication of the custom setting is not readily displayed. Instead, a user has to pass one or more displays (e.g., secondary dialog boxes) to see what the currently selected custom setting is. Added navigation through displays can be cumbersome and time-consuming to the user.

Thus, there is a need to display currently selected custom settings in a preference selection location. Further, there is a need for updating a list view item based on configuration settings. Yet even further, there is a need to select and present user customizable preferences.

The teachings hereinbelow extend to those embodiments which fall within the scope of the appended claims, regardless of whether they accomplish one or more of the above-mentioned needs.

SUMMARY OF THE INVENTION

The present invention relates to a system for and method of selecting and presenting user customizable preferences. Techniques involved can include having a customizable selection in a display of user preference selections such that the display for the customizable selection updates it displayed selection based upon the configuration settings. As such, the user can see what has been set as a custom preference without having to go into secondary dialog boxes. The technique can be particularly advantageous with wireless devices that need to minimize the number of fields that must be viewed to get information.

An exemplary embodiment of the present invention relates to a method of selecting and presenting user customizable preferences. This method can include providing a display having user preference selections such as a customizable selection, receiving a customized user preference selection, and presenting the customized user preference selection along with the customizable user preference selection in the display of user preference selections.

Another exemplary embodiment of the present invention relates to a user interface which facilitates the selection and presentation of user customizable preferences. This user interface can include means for providing a display listing user preference selections including a customizable selection, means for receiving a customized user preference selection, and means for presenting the customized user preference selection along with the customizable selection in the display of user preference selections.

Another exemplary embodiment of the present invention relates to a processing system including a central processing unit (CPU) and a storage device coupled to a processor and having stored there information for configuring the CPU. The CPU can be configured to: provide a display having a customizable user preference selection entry in a listing of user preference selections, receive a customizable user preference selection, and present the customized user preference selection along with the customizable user preference selection entry in the user preference selection list.

Other features and advantages of embodiments of the present invention will become apparent to those skilled in the art upon review of the following drawings, the detailed description, and the appended claims.

BRIEF DESCRIPTION OF THE DRAWINGS

The invention is illustrated by way of example and not limitation using the figures of the accompanying drawings, in which like references indicate similar elements and in which.

DETAILED DESCRIPTION OF THE EXEMPLARY EMBODIMENTS

A system for and method of selecting and presenting user customizable preferences are described herein. In the following description, for purposes of explanation, numerous specific details are set forth to provide a thorough understanding of exemplary embodiments of the invention. It will be evident, however, to one skilled in the art that the invention may be practiced without these specific details. In other instances, structures and devices are shown in block diagram form to facilitate description of the exemplary embodiments.

In one embodiment, a computer system is used which has a processing unit or central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, hardwired circuitry may be used in place of, or in combination with, software instructions to implement the functions described. Thus, the embodiments described herein are not limited to any specific combination of hardware circuitry and software, nor to any particular source for the instructions executed by the computer system.

Figure 1:
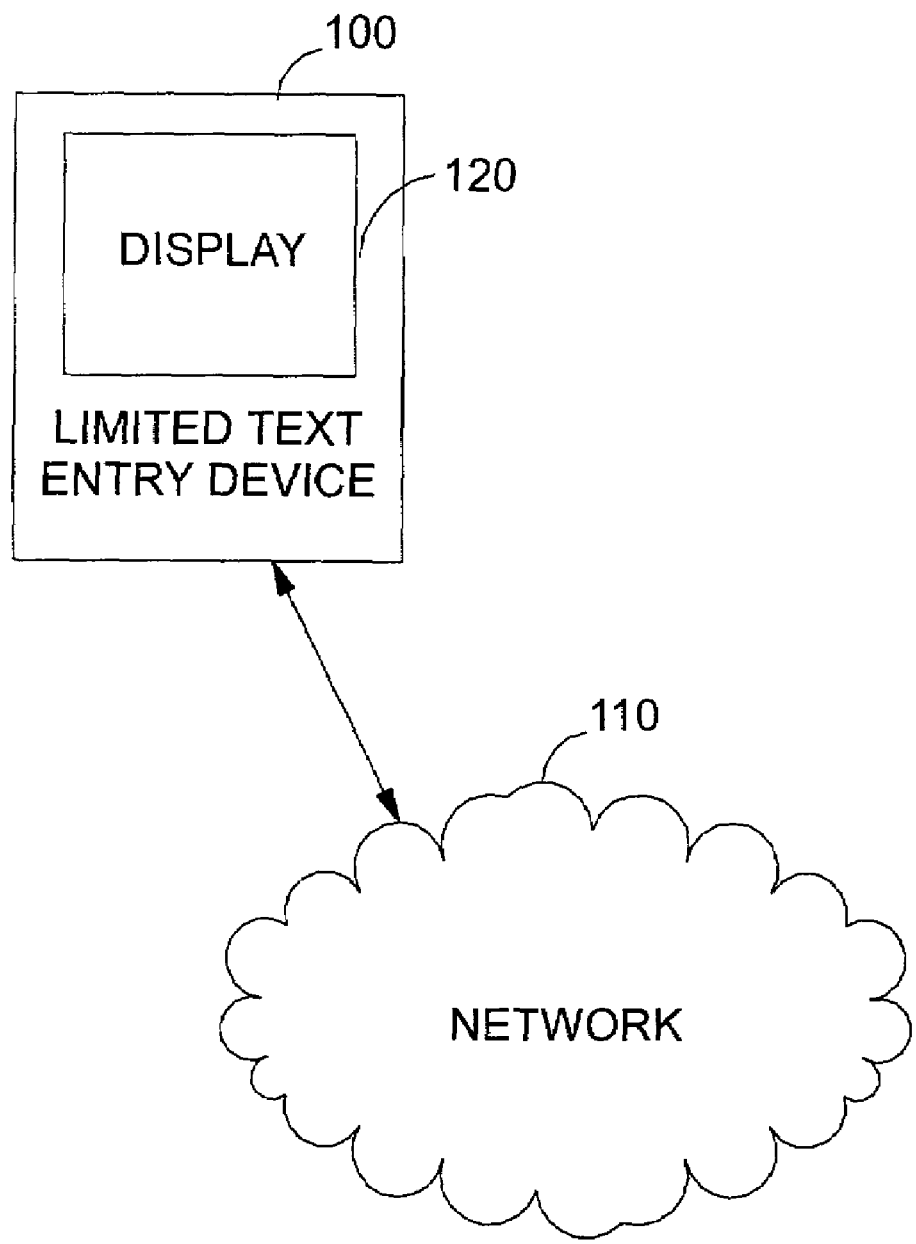
FIG. 1 is a general block diagram of a limited text entry device communicatively coupled to a network in accordance with an exemplary embodiment.

FIG. 1 illustrates a device 100 configured to communicate with a network 110. Device 100 can be wireless cellular digital phone (e.g., a WAP phone), a handheld personal digital assistant, a two-way text messaging device (e.g., two-way pager), a laptop computer, a handheld computer, or any other such device. In an exemplary embodiment, network 110 is the Internet, a worldwide network of computer networks that use various protocols to facilitate data transmission and exchange. Network 110 can use a protocol, such as, the TCP/IP network protocol or the DECnet, X.25, and UDP protocols. In alternative embodiments, network 110 is any type of network, such as, a virtual private network (VPN), an Internet, an Ethernet, or a Netware network. Further, network 110 can include a configuration, such as, a wireless network, a wide area network (WAN) or a local area network (LAN). Network 110 preferably provides communication with Hypertext Markup Language (HTML) Web pages.

Device 100 includes a display 120 that is configured to present textual and graphical representations. Display 120 can be a monochrome, black and white, or color display and can be configured to allow touch screen capabilities. Device 120 can include a processor and a memory device. In one embodiment, display 120 can include a limited real estate space for presenting information. Depending on the type of device 100, display 120 can have a wide variety of different dimensions. In an exemplary embodiment, display 120 is a WAP phone display having twelve horizontal lines of text capability. In alternative embodiments, display 120 can include more or fewer lines of text.

Figure 2:
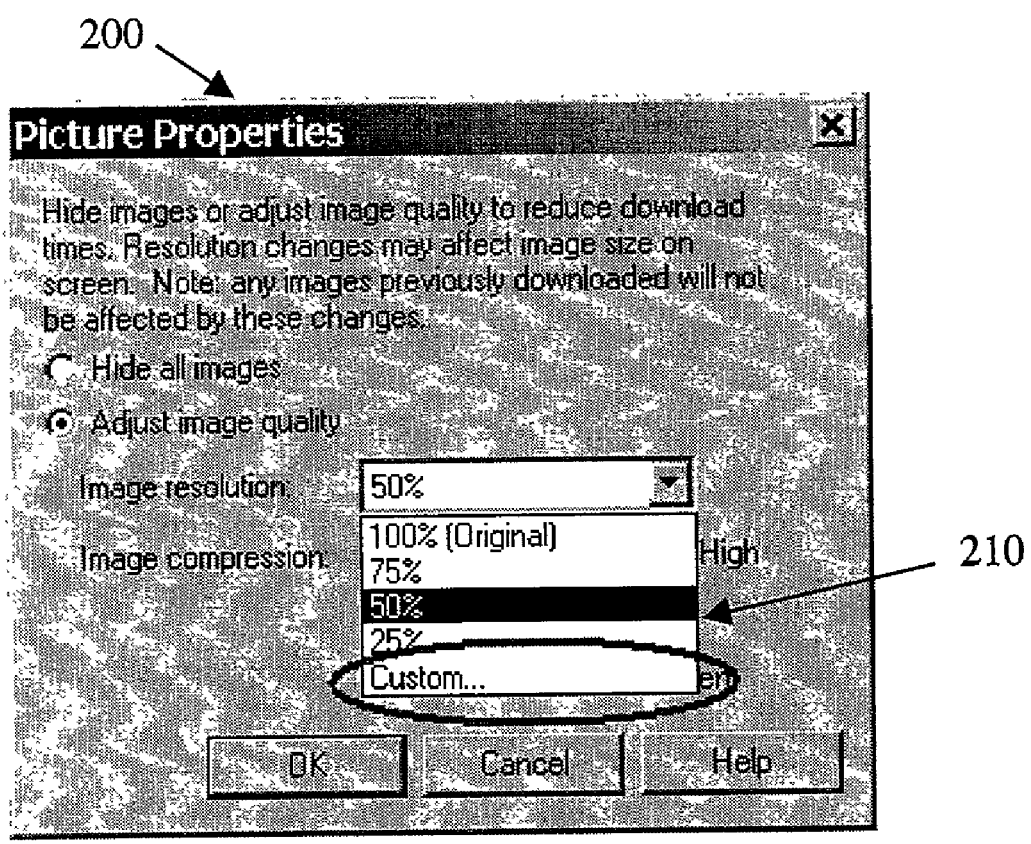
FIG. 2 is a screen display illustrating a custom entry in a list box in accordance with an exemplary embodiment.

FIG. 2 illustrates a display 200 including a list box 210. List box 210 can be, for example, a drop down box and can include a number of user specified preferences. In an exemplary embodiment, list box 210 can include a percentage of image compression, such as, 100%, 75%, 50%, and Custom. By way of example, the configuration of the Web Connector component of the Wireless Business Engine developed and sold by Infowave Software, Inc. of Burnaby, British Columbia, Canada, allows for a custom entry in a list box. If "Custom" is selected from list box 210, the user can type a number, such as, 61% to specify a user-defined preference. Display 200 can be presented on a device, such as, a personal computer or device 100 described with respect to FIG. 1.

Figure 3:
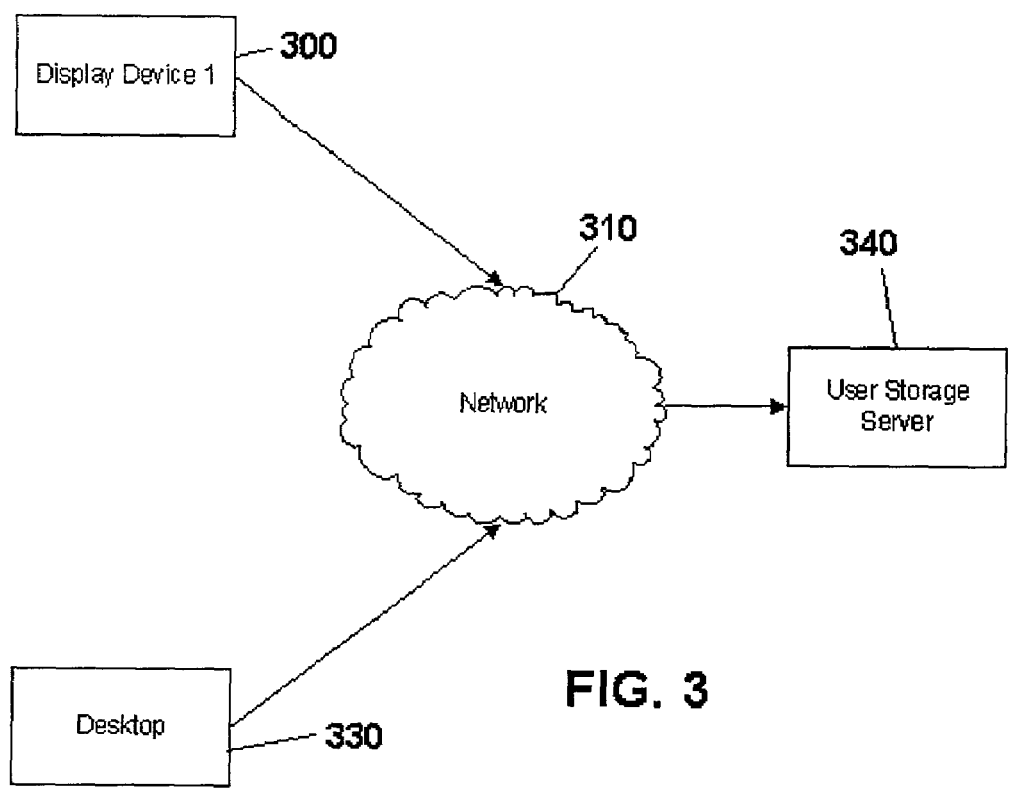
FIG. 3 is a general block diagram of a display device and a desktop computer communicatively coupled to a network and a storage server in accordance with another exemplary embodiment.

FIG. 3 illustrates a device 300 coupled to a network 310 and a desktop computer 330 coupled to network 310. In an exemplary embodiment, device 300 is a portable device that communicates with network 310 using wireless technology. Device 300 queries a user storage memory located on a user storage server 340 to obtain user preference information. User storage server 340 can be any of a variety of memory devices or devices including memory and is accessible via network 310. Desktop computer 330 can be any of a variety of computing devices configured for use in an office or at a desktop.

Device 300 and desktop computer 330 both configure a display or other configurable parameter based on user preference information contained on user storage server 310. Device 300 displays a menu having a list of options in its device format. Similarly, desktop computer 330 displays menus and other information according to its operating system. For example, menu information on device 300 can be displayed using a variety of different operating systems (OS) and operating formats, such as the PALM™ OS, Microsoft WINDOWS PC™ OS, wireless application protocol (WAP) operating systems, and any other format. Different preferences are available depending on the type of device. Further, preferences can be set according to parameters of the particular device and operating system of the device.

Advantageously, user storage server 340 provides a shared storage medium that maintains user preferences accessible by both device 300 and desktop computer 330. For example, user storage server 340 including user preferences can be queried by individual devices what then in turn display menu items based upon retried values.

Figure 4:
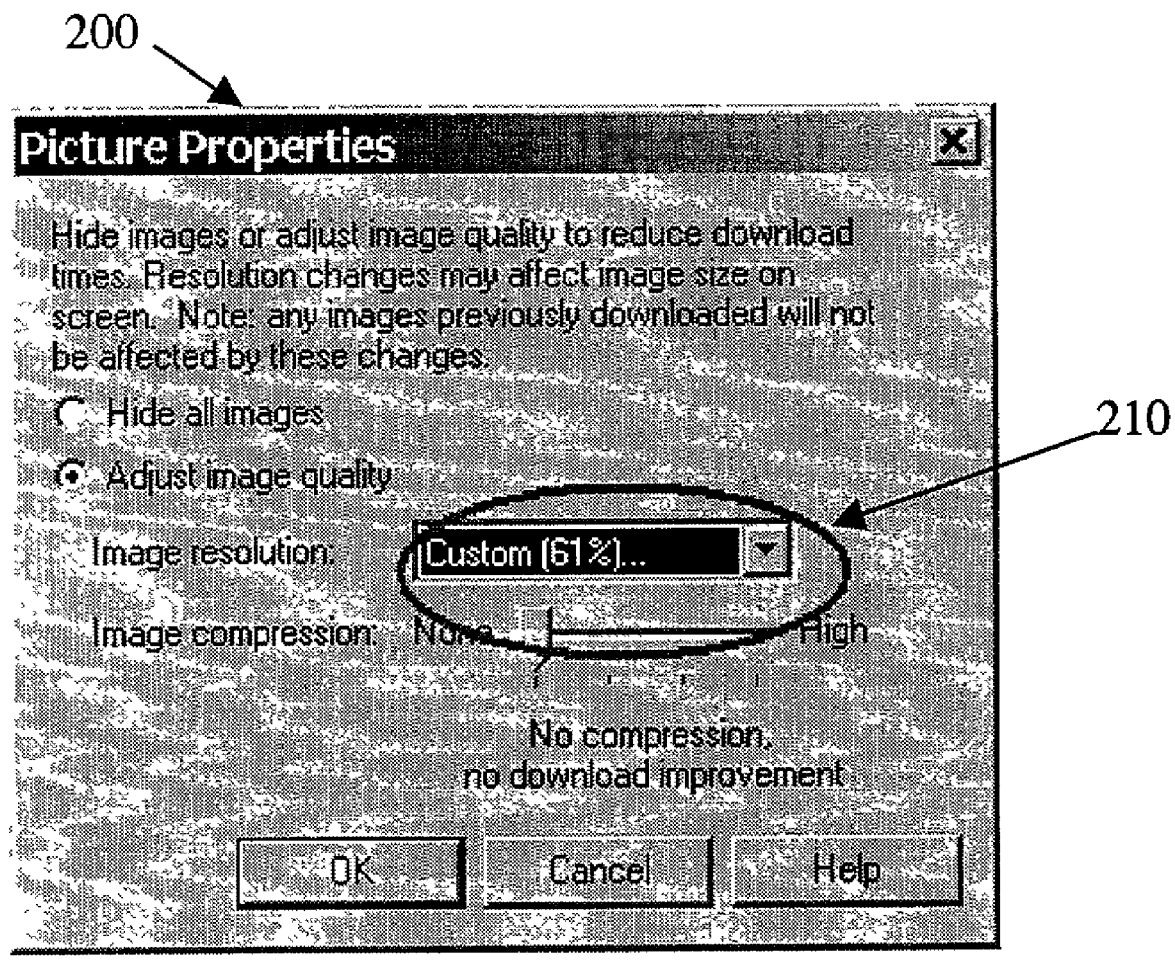
FIG. 4 is a screen display illustrating a retained customized entry in a list box in accordance with an exemplary embodiment.

FIG. 4 illustrates display 200 after a custom value has been entered into list box 210. Advantageously, the custom value entered appears in parenthesis next to the label "Custom." As such, the user can visually see what has been set as the preference without having to go into secondary dialog boxes. This is helpful since the user does not need to traverse additional fields to view customized settings, thereby, increasing productivity.

Figure 5:
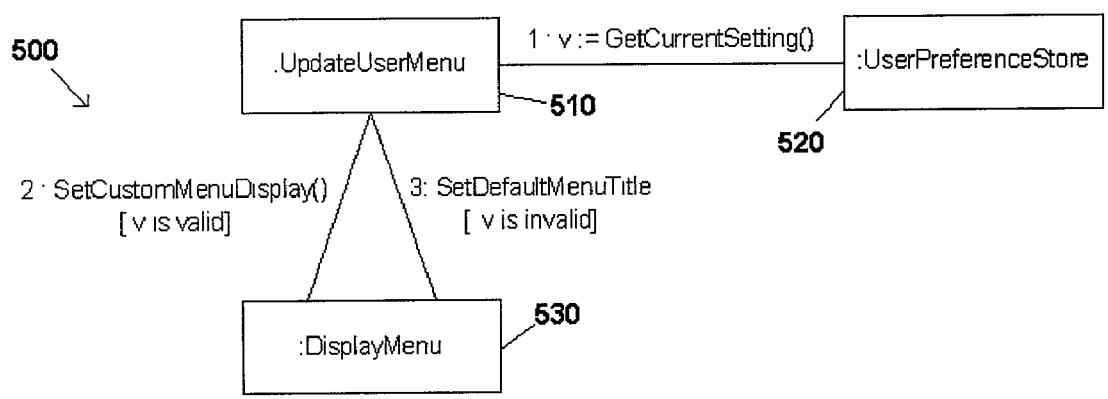
FIG. 5 is a flow diagram illustrating a markup language implementation in accordance with an exemplary embodiment.

FIG. 5 illustrates a flow diagram 500 depicting exemplary steps in a method of retaining and selecting user customizable preferences. Flow diagram 500 is depicted using a universal modeling language (UML) sequence diagram.

In a step 510, an update user menu procedure is performed in which a current setting is obtained. In an exemplary embodiment, the current setting is obtained by accessing a user storage server. In a step 520, a user preference store procedure is performed in which current setting information is retrieved. If the current setting is valid, a display menu procedure is performed in a step 530 using custom menu settings obtained in steps 510 and 520. If the current setting in invalid, the display menu procedure of step 530 is performed; however, default menu settings are used.

While the embodiments illustrated in the FIGURES and described above are presently preferred, it should be understood that these embodiments are offered by way of example only. Other embodiments may include additional procedures or steps not described here. The invention is not limited to a particular embodiment, but extends to various modifications, combinations, and permutations that nevertheless fall within the scope and spirit of the appended claims.

What is claimed is:

1. A method of selecting and presenting user customizable preferences, the method comprising:
providing a user interface display having a list of user preference selection fields, the user preference selection fields comprising defined selection fields presenting predefined values for an operating parameter from which a user may select and a customizable selection field, the customizable selection field permitting a user to input a customized user preference value for the operating parameter;
receiving a selection of the customizable selection field;
receiving the customized user preference value as an input value to the customizable selection field; and
presenting the customized user preference value in the list of user preference selection fields along with the customizable selection field.

2. The method of claim 1, wherein the step of receiving a customized user preference value includes launching a data entry request window when the customized selection field is selected.

3. The method of claim 1, wherein the step of receiving a customized user preference value includes accessing a stored value previously entered by a user.

4. The method of claim 1, wherein the customizable selection field is set to be a default selection in the list of user preference selection fields such that the customizable selection field and customizable user preference value are displayed in the list of user preference selection fields.

5. The method of claim 1, wherein the step of presenting the customized user preference value along with the customizable selection field in the list of user preference selection fields includes presenting the customized user preference value in parenthesis next to the customizable selection field in the list of user preference selection fields.

6. The method of claim 5, wherein the customizable selection field corresponds to a specific image compression percentage.

7. The method of claim 1, wherein the user interface display is a display on a limited text entry device.

8. The method of claim 1, wherein the customized user preference value is a number.

9. The method of claim 1, wherein the step of presenting the customized user preference value along with the customizable selection field in the list of user preference selection fields includes updating the customizable selection field in the list of user preference selection fields based upon configuration settings.

10. A user interface configured to select and present user customizable preferences, the user interface comprising:
    means for providing a display having a list of user preference selection fields, the user preference selection fields comprising defined selection fields presenting predefined values for an operating parameter from which a user may select and a customizable selection field, the customizable selection field permitting a user to input a customized user preference value for the operating parameter;
    means for receiving a selection of the customizable selection field;
    means for receiving the customized user preference value; and
    means for presenting the customized user preference value along with the customizable selection field in the list of user preference selection fields.

11. The user interface of claim 10, wherein the means for receiving a customized user preference value includes means for launching a data entry request window when the customizable selection field is selected.

12. The user interface of claim 10, wherein the means for receiving a customized user preference value includes means for accessing a stored value previously entered by a user.

13. The user interface of claim 10, wherein the means for presenting the customized user preference value along with the customizable selection field in the list of user preference selection fields includes means for presenting the customized user preference value in parenthesis next to the customizable selection field in the list of user preference selection fields.

14. The user interface of claim 10, wherein the customized user preference value corresponds to a specific image compression percentage.

15. The user interface of claim 10, wherein the user preference selection fields are presented in a drop down list.

16. The user interface of claim 10, further comprising means for communicating the customized user preference value to a host computer via a network.

17. A processing system comprising:
    a central processing unit (CPU); and
    a storage device coupled to a processor and having stored there information for configuring the CPU to:
        provide a user interface display having a customizable selection field, the customizable selection field permitting a user to input a customized user preference value for an operating parameter in a list of user preference selection fields additionally including defined selection fields presenting predetermined values for the operating parameter from which a user may select;
        receive a selection of the customizable selection field;
        receive a customized user preference value; and
        present the customized user preference value along with the customizable selection field in the list of user preference selection fields.

18. The system of claim 17, wherein the presentation of the customized user preference value along with the customizable selection field in the list of user preference selection fields includes presenting the customized user preference value in parenthesis next to the customizable selection field in the list of user preference selection fields.

19. The system of claim 17, wherein the customized user preference value corresponds to a specific image compression percentage.

20. The system of claim 17, wherein the CPU is further configured to store a previously entered user preference value.

* * * * *